(12) United States Patent
Hernacki et al.

(10) Patent No.: US 8,181,028 B1
(45) Date of Patent: May 15, 2012

(54) METHOD FOR SECURE SYSTEM SHUTDOWN (75) Inventors: Brian Hernacki, San Carlos, CA (US); Sourabh Satish, Fremont, CA (US)

(73) Assignee: Symantec Corporation, Mountian View, CA (US)

( * ) Notice: Subject to any disclaimer, the term of this patent is extended or adjusted under 35 U.S.C. 154(b) by 1002 days.

(21) Appl. No.: 12/140,993

(22) Filed: Jun. 17, 2008

(51) Int. Cl.
*G06F 21/00* (2006.01)
(52) U.S. Cl. ............ 713/182; 713/2; 713/183; 713/324; 726/16; 726/17; 726/18; 726/19; 726/20; 380/277; 705/71
(58) Field of Classification Search .............. 713/2, 182, 713/183, 324; 726/16, 17, 18, 19, 20; 380/277; 705/71
See application file for complete search history.

(56) References Cited

U.S. PATENT DOCUMENTS

| | | | | |
|---|---|---|---|---|
| 7,043,643 | B1 * | 5/2006 | Doe et al. | 713/189 |
| 7,260,726 | B1 * | 8/2007 | Doe et al. | 713/189 |
| 2006/0294395 | A1 * | 12/2006 | Ogram | 713/189 |
| 2007/0257813 | A1 * | 11/2007 | Vaswani et al. | 340/870.02 |
| 2009/0019527 | A1 * | 1/2009 | Winslow | 726/4 |

* cited by examiner

*Primary Examiner* — April Shan
(74) *Attorney, Agent, or Firm* — McKay and Hodgson, LLP; Sege J. Hodgson; Sean P. Lewis (57) ABSTRACT

In one embodiment, a key list entry corresponding to a user's private key is securely deleted from a key list of a user device on shutdown of the user device. Subsequently, input of the user's private key will not allow decryption of an encrypted partition storing encrypted data on the user device. In another embodiment, a key list entry corresponding to a user's private key is automatically and securely re-provisioned on boot up of the user device. Subsequently, input of the user's private key will allow decryption of the encrypted partition on the user device.

18 Claims, 10 Drawing Sheets

METHOD FOR SECURE SYSTEM SHUTDOWN

BACKGROUND OF THE INVENTION

1. Field of the Invention

The present invention relates to computer systems. More particularly, the present invention relates to the protection of encrypted data.

2. Description of Related Art

Users of laptop computer systems and similar devices are frequently mobile with the computer systems. A laptop computer system is easily lost, stolen or illicitly accessed. This creates risk not only due to loss of the data stored on the laptop computer system but also due to potential parent system compromise, such as compromise of a larger corporate network or corporate database.

Some current solutions advocate that the user utilize whole disk encryption to protect the data on the laptop computer system from compromise. In a simple loss scenario, whole disk encryption protects against these risks; however, whole disk encryption is insufficient protection in the face of threats which involve coercing access from the user.

For example, consider a user transiting a high risk area with a laptop computer system containing encrypted data. During transit, the user can be stopped and asked to provide access to the laptop computer system. While the data on the laptop computer system is encrypted, the user can be coerced to provide the password or other information to access the encrypted data. In some cases, regional laws may even compel a user to provide this access information. Once the access information is divulged, the coercer has access to the laptop computer system, the data, and potentially the parent system. Even if the laptop computer system is returned, the laptop computer system is potentially compromised, and the data at risk.

SUMMARY OF THE INVENTION

In one embodiment, a computer implemented method for secure shutdown of a user device includes: detecting a shutdown of a user device, the user device including a key list having a first key list entry corresponding to a user private key for use in decrypting an encrypted partition storing encrypted data on the user device; determining whether or not to securely shutdown the user device; and upon a determination to securely shutdown the user device, deleting the first key list entry from the key list; and permitting the shutdown of the user device to proceed. Subsequently, input of the user's private key will not allow decryption of encrypted partition on the user device as the corresponding key list entry is no longer present in the key list of the user device.

In another embodiment, a computer implemented method for automated secure key re-provisioning includes: detecting a boot up of a user device, the user device including a key list having one or more key list entries for use in decrypting an encrypted partition storing encrypted data on the user device; querying a user for input of at least one user credential; receiving the input of the at least one user credential; obfuscating the at least one user credential, the obfuscating generating at least one obfuscated user credential; generating a key re-provisioning request, the key re-provisioning request requesting a key re-provisioning and including the at least one obfuscated user credential; sending the key re-provisioning request to a key management system device; receiving a key re-provisioning response from the key management system device, the key re-provisioning response including at least a key re-provisioning password; locating a key list entry in the key list corresponding to the key re-provisioning password, the key list entry including an encrypted session key; decrypting the session key utilizing at least the key re-provisioning password; querying a user for input of at least one user password; receiving the input of the at least one user password; encrypting the session key utilizing the at least one user password; generating a new key list entry corresponding to the user private key in the key list; and allowing the boot up of the user device to proceed. In some embodiments, the computer implemented method further includes decrypting the encrypted partition.

Embodiments in accordance with the invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
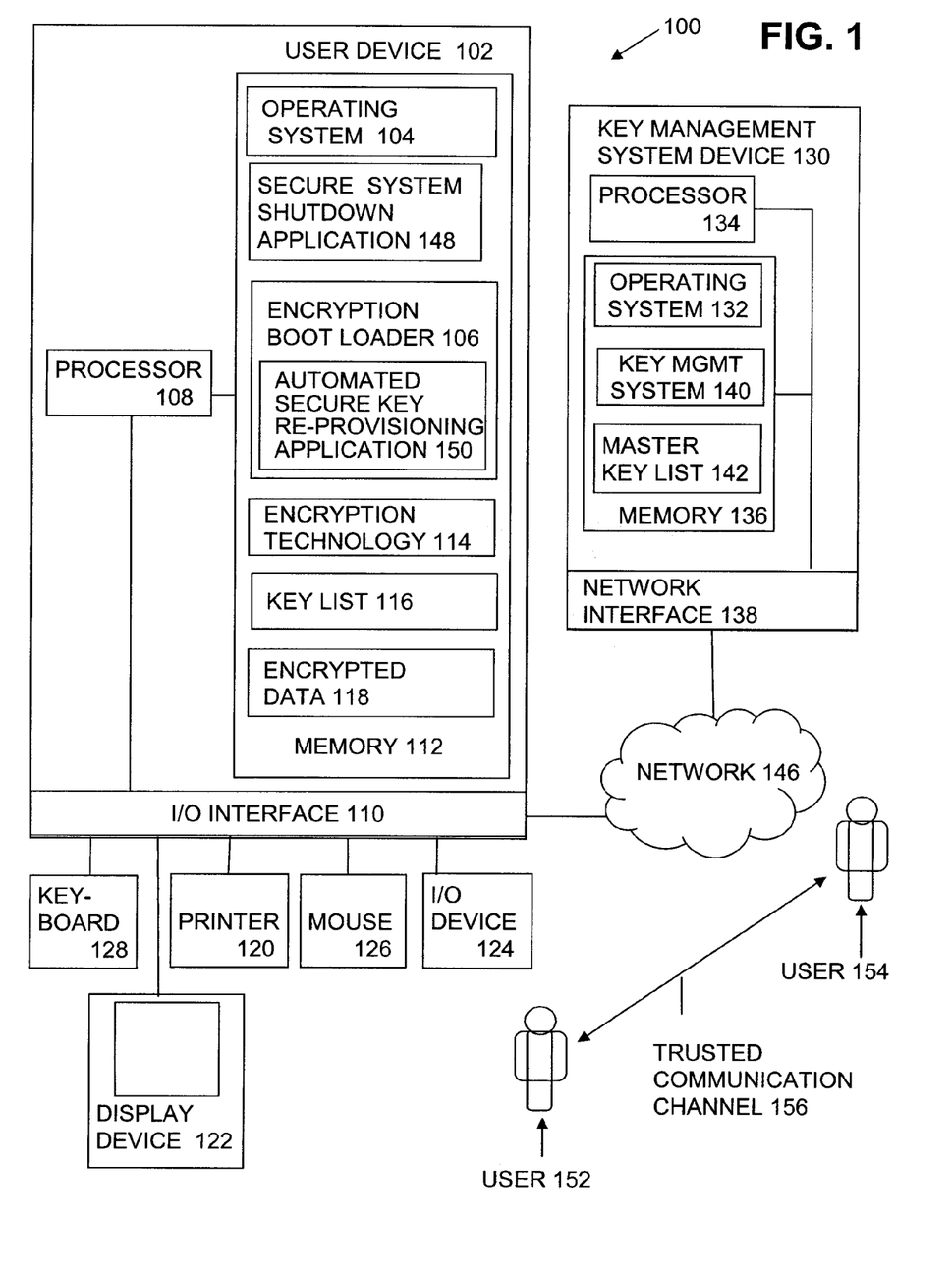
FIG. 1 is a diagram of a computer system including a secure shutdown application and an automated secure key re-provisioning application in accordance with one embodiment.

FIG. 1 is a diagram of a computer system 100 including a secure system shutdown application 148 and an automated secure key re-provisioning application 150 executing on a user device 102, e.g., a first device, in accordance with one embodiment. In various embodiments, one or both of secure system shutdown application 148 and automated secure key re-provisioning application 150 are present on user device 102. User device 102 can be, for example, a desktop computer system, a laptop computer system, a mobile phone, a personal digital assistant (PDA), or other device capable of storing information in an encrypted storage area, such as an encrypted partition of a data storage disk.

User device 102 typically includes a central processing unit (CPU) 108, hereinafter processor 108, an input/output (I/O) interface 110, a memory 112, and an operating system 104. In one embodiment, memory 112 includes storage media (not shown) for permanent storage of files, sometimes called physical storage memory, non-volatile memory, non-temporary storage memory, non-temporary storage media, or permanent storage memory. For example, in one embodiment, the storage media is a hard drive, e.g., a magnetic hard drive, a floppy disk, a CD-ROM, and/or a DVD. Generally, files stored in permanent storage memory, e.g., a magnetic hard disk, a floppy disk, a CD-ROM, a DVD, are unaffected and maintained, i.e., are not lost, upon powering down (turning off) of user device 102.

In various embodiments, memory 112 further includes volatile memory for non-permanent storage of files, sometimes called temporary storage memory, non-temporary storage media, or non-permanent storage memory. Generally, files stored in non-permanent storage memory, are lost upon powering down (turning off) of user device 102.

In one embodiment, memory 112 of user device 102 further includes secure system shutdown application 148, an encryption boot loader 106, and automated secure key provisioning application 150. In various embodiments, secure system shutdown application 148 is loaded as an operating system (OS) extension, a stand alone program, or a hypervisor in a virtualization environment. In one embodiment, automated secure key re-provisioning application 150 is loaded as part of encryption boot loader 106, however, in other embodiments automated secure key re-provisioning application 150 is loaded as a stand-alone application that is accessible by encryption boot loader 106.

In one embodiment, operating system 104 utilizes an encryption technology 114, such as a whole disk encryption technology, in which at least one area of a storage medium, such as a storage disk partition, is encrypted, i.e., stores encrypted data, e.g., encrypted data 118.

A typical whole disk encryption configuration on disk includes an encrypted partition (not shown) storing encrypted data 118, key list 116, and encryption bootloader 106 which manages the decryption of encrypted data 118. The encrypted partition can be viewed as E1 (P, K-session), where P is the partition, K-session is an arbitrary, generated session key, and E1 is a symmetric algorithm such as AES. Thus, the partition is encrypted via AES with K-session, the session key.

Key list 116 is a list where each entry N is E2(K-session, K-pub-N) where E2 is a public key algorithm such as RSA, K-pub-N is the public key of a key pair for which there is a corresponding K-pri-N. At boot time, a user provides a K-pri-N, herein termed the user private key, for one of the key list entries in key list 116. This allows encryption boot loader 106 to decrypt the partition as D1(P, D2(entry-N, K-pri-N)). Typically the user has one of the K-pri-N, e.g., a user private key, and an information technology (IT) department has the other keys which are kept for IT management or lost-key recovery purposes.

Figure 2A:
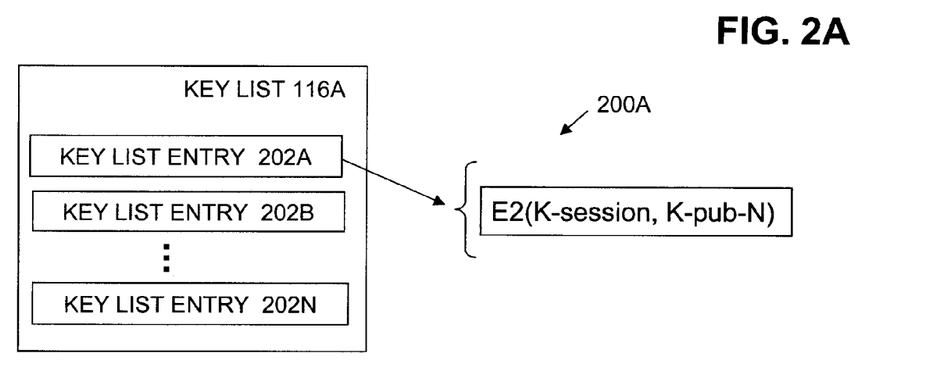
FIG. 2A is a diagram illustrating a key list including one or more key list entries.

In the present embodiment, key list 116 is a list of entries, e.g., key list entries 202A-202N, in which each entry N includes an encrypted session key that corresponds to a user's private key, K-pri-N. Each entry in key list 116 retains a public key, K-pub-N, of a public-private key pair (K-pub-N; K-pri-N) that is used to decrypt the session key, K-session. The session key is then used to decrypt the partition allowing access to encrypted data 118. Thus, a key list entry 202A-202N in key list 116 is of the form E2(K-session, K-pub-N), where E2 is a public key algorithm such as RSA, K-pub-N is the pubic key of a key pair for which there is a corresponding user private key, K-pri-N, and K-session is an encrypted session key.

FIG. 2A is a diagram of a key list 116A including one more key list entries 202A-202N. In one embodiment, key list entry 202A is an entry that corresponds to a user private key, e.g., K-pri-N, utilized by user 152 for accessing encrypted data 118 on user device 102. Typically for a user to access the encrypted data on the encrypted partition, the user provides a user private key, K-pri-N. The user private key, K-pri-N, is corresponded to an associated key list entry, e.g., one of key list entries 202A-202N, in key list 116A, for example, key list entry 202A.

The correspondence completes the public-private key sequence, e.g., completes the key pair (K-pub-N;K-pri-N), and decrypts the encrypted session key, K-session, in the key list entry. The decrypted session key is then used to decrypt a disk access key of the encrypted partition and thus decrypts encrypted data 118. Disk encryption mechanisms, such as whole disk encryption mechanisms, are well known to those of skill in the art and are not further described herein to avoid detracting from the description.

User device 102 may further include standard devices like a keyboard 128, a mouse 126, a printer 120, and a display device 122, as well as, one or more standard input/output (I/O) devices 124, such as a compact disk (CD) or DVD drive, floppy disk drive, or other digital or waveform port for inputting data to and outputting data from user device 102. In one embodiment, secure system shutdown application 148 and/or automated secure key re-provisioning application 150 are loaded onto user device 102 via I/O device 124, such as from a CD, DVD, floppy disk, or other storage device containing secure system shutdown application 148 and/or automated secure key re-provisioning application 150.

In one embodiment, user device 102 is coupled to a key management system device 130 of system 100 by a network 146. Key management system device 130 typically includes an operating system 132, a processor 134, a memory 136, and a network interface 138. In one embodiment, key management system device 140 utilizes a key management system 140, such as Dynamic Host Configuration Protocol (DHCP), and further includes a master key list 142.

Figure 3:
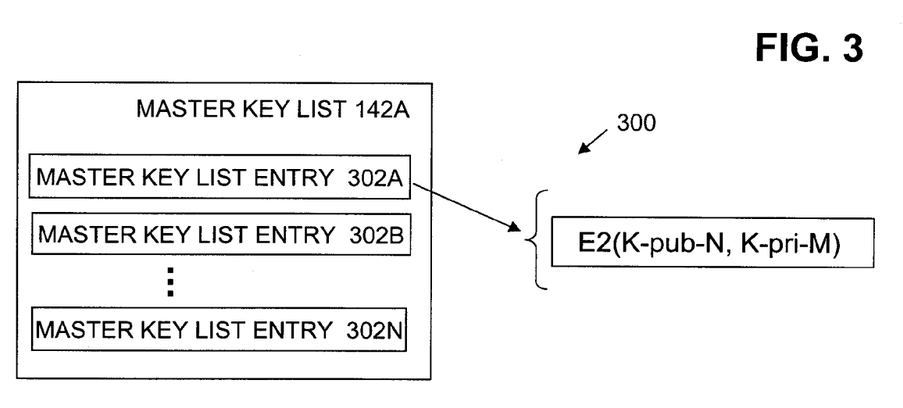
FIG. 3 is a diagram illustrating a master key list including one or more master key list entries in accordance with one embodiment.

In one embodiment, master key list 142 is a list in which each master key list entry 302A-302N is a copy of a private key for a key list entry in a key list on a user's device. Each master key list entry 302A-302N in master key list 142 retains a private key, K-pri-N, associated with a user and a public portion, K-pub-N, of a public-private key pair (K-pub-N; K-pri-N). Thus, a master key list entry in master key list 142 is of the form E2(K-pub-N, K-pri-N), where E2 is an encryption algorithm such as AES, K-pub-N is a public key and K-pri-N is a private key associated with a user.

FIG. 3 is a diagram of a master key list 142A including one more master key list entries 302A-302N. In one embodiment, master key list entry 302A is an entry that corresponds to a user private key, e.g., K-pri-N, utilized by a user 152 of user device 102 for accessing encrypted data 118 on user device 102. In one embodiment, master key list entry 302A includes the user's public key, K-pub-N, and a private key K-pri-M. Master key list 142 may include one or more other master key list entries corresponding to other user private keys on other user devices, as well as one or more other master key entries corresponding to user private keys on user device 102.

Key management system device 130 may further include standard devices such as a keyboard, a mouse, a printer, a display device and an I/O device(s). The various hardware components of server computer system 130 are not illustrated to avoid detracting from the description.

Network 146 can be any network or network system that is of interest to a user. In various embodiments, network interface 138 and I/O interface 110 include analog modems, digital modems, or a network interface card. The particular type, and configuration, of user device 102 and key management system device 130 are not essential to the present embodiment.

In some embodiments, user 152 of user device 102 can communicate with a user 154 of key management system device 130 over a trusted communication channel 156. For example, user 152 and user 154 can establish a secure telephone connection, e.g., a trusted communication channel 156, such that authentication and verification procedures, as well as key management passwords, e.g., key re-provisioning information, are communicated between user 152 and user 154 over trusted communication channel 156. In some embodiments, user device 102 and/or key management system device 130 include stored system policy information (not shown), such as secure shutdown policy information, accessible by user device 102 and/or key management system device 130.

Figure 4:
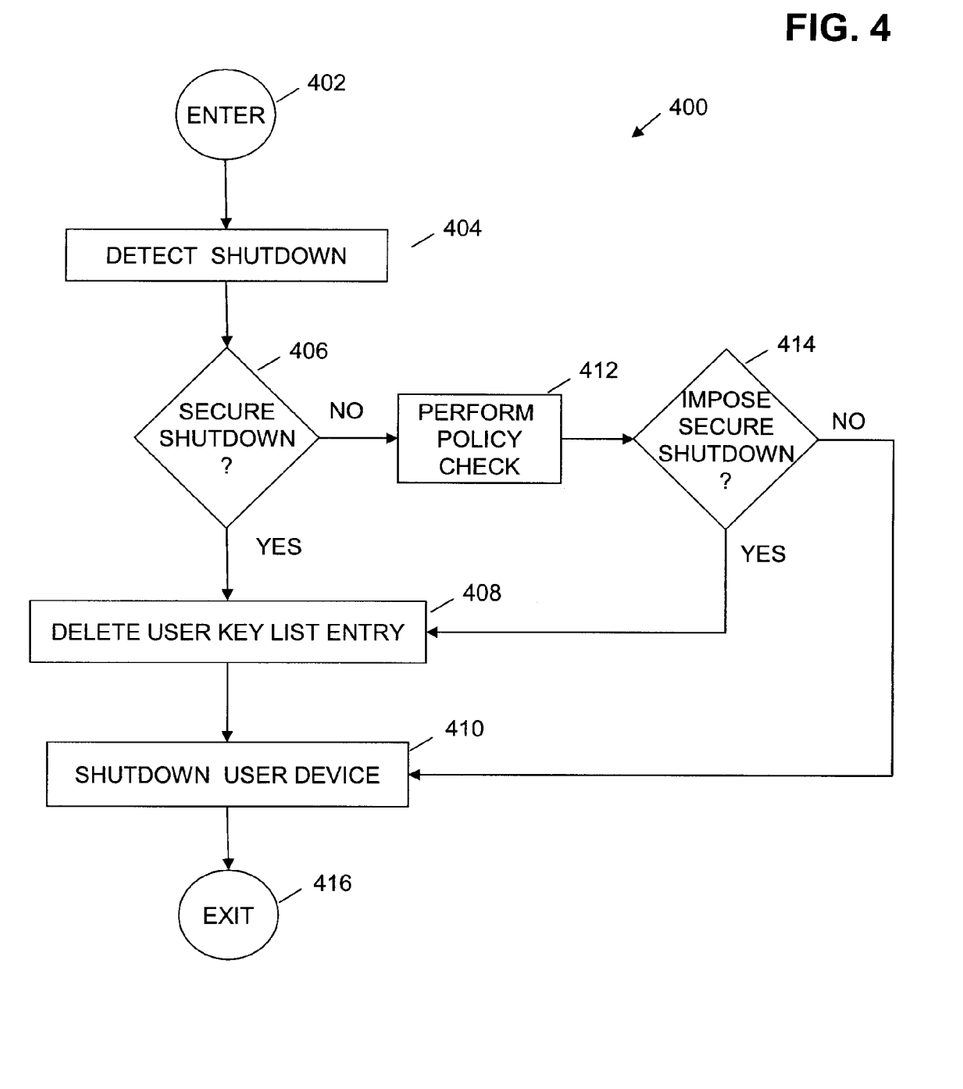
FIG. 4 is a process flow diagram of a method for secure system shutdown in accordance with one embodiment.

As further described herein with reference to FIG. 4, in one embodiment, a secure shutdown process 400 is implemented by secure system shutdown application 148 which removes a user's key list entry, which corresponds to the user's private key, K-pri-N, from key list 116. Consequently, the user is unable to access encrypted data 118 on user device 102.

Figure 7A:
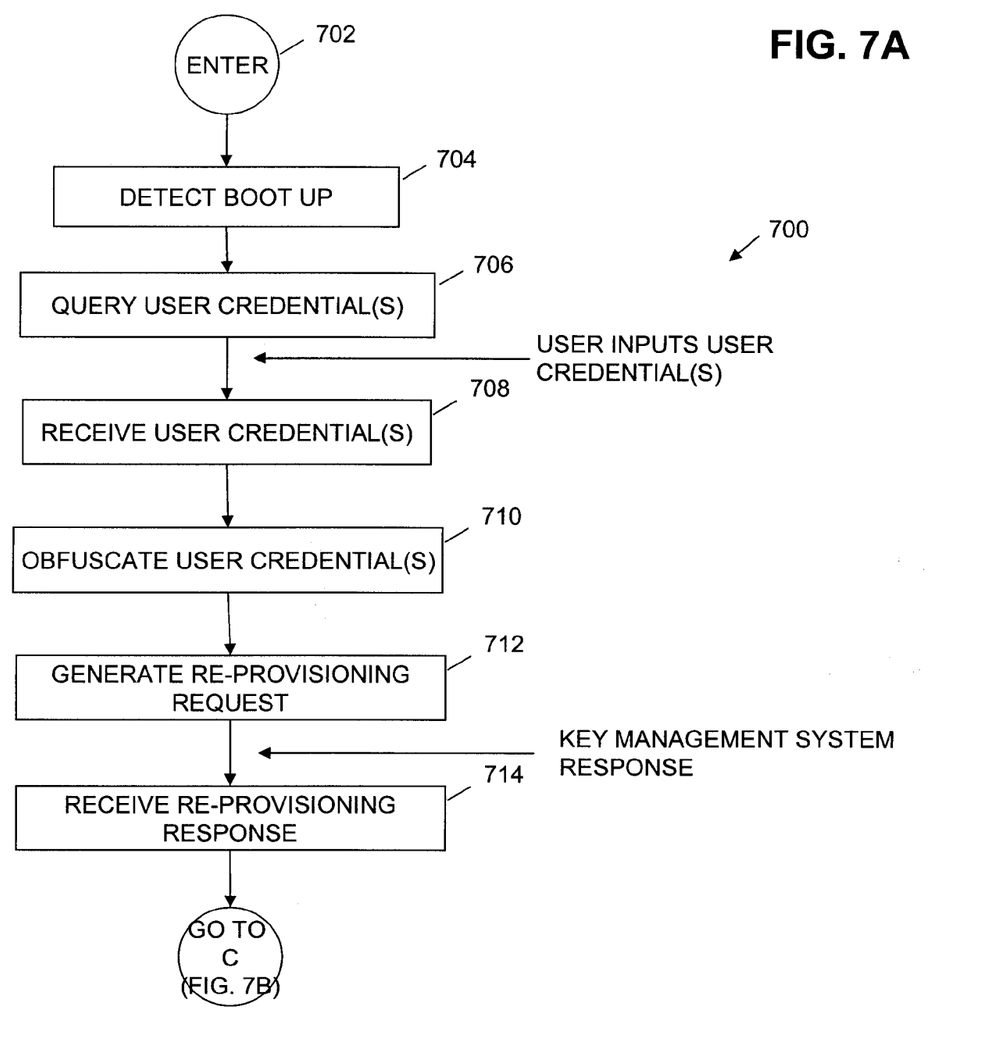
FIGS. 7A and 7B are a process flow diagram of a method for automated secure key re-provisioning in accordance with one embodiment.
Figure 7B:
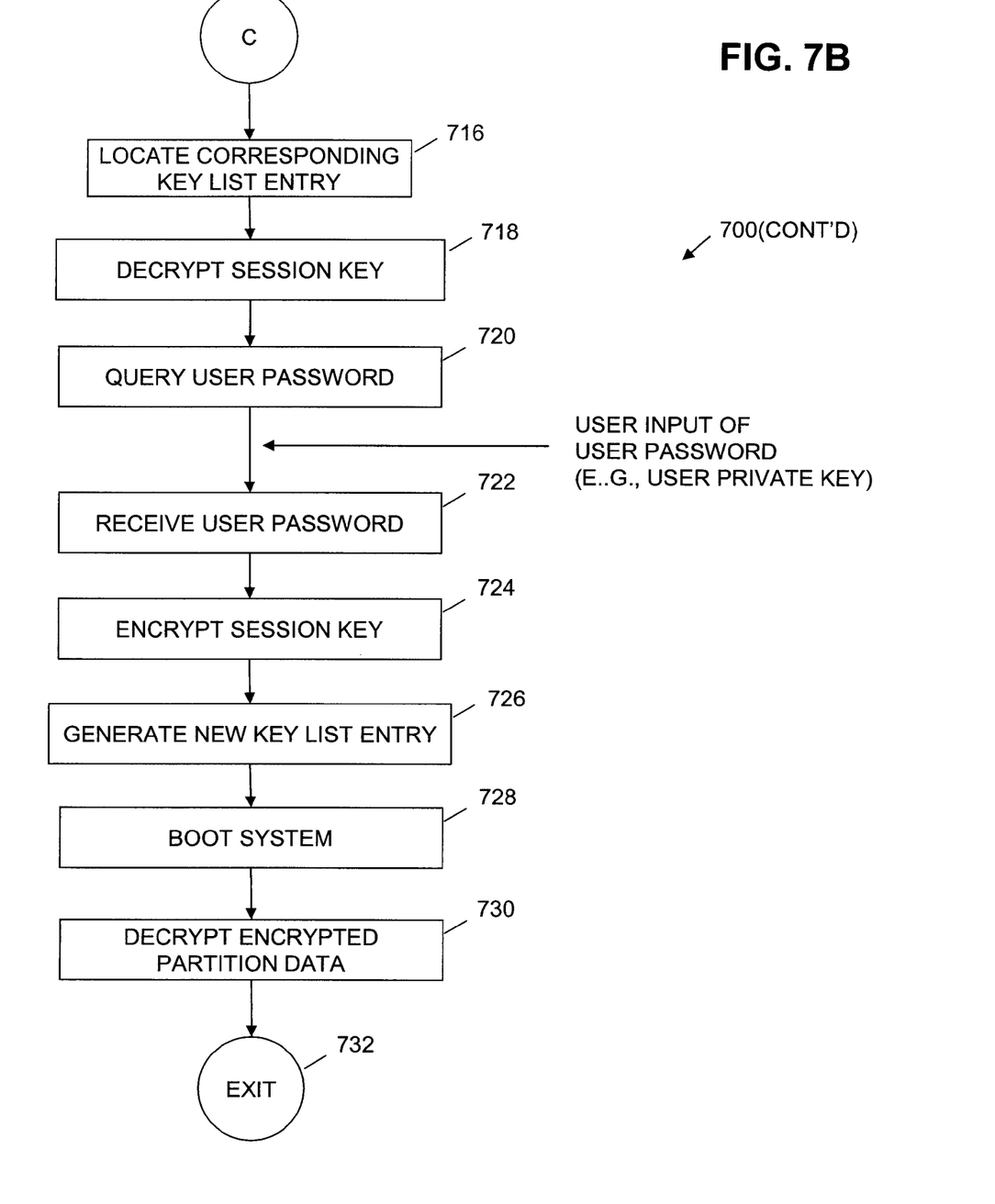

As further described herein with reference to FIGS. 7A and 7B, in a further embodiment, an automated secure key re-provisioning process 700 is implemented to automatically and securely restore a user's access to the encrypted data on user device 102. In one embodiment, a user key list entry corresponding to the user's private key is automatically generated and added to key list 116. Consequently, the user is able to access encrypted data 118 on user device 102.

FIG. 4 illustrates a process flow diagram of a method 400 for secure system shutdown in accordance with one embodiment. Referring now to FIGS. 1, 2A/2B, and 4 together, in one embodiment, execution of secure system shutdown application 148 by processor 108 results in the operations of method 400 as described below. In one embodiment, method 400 is entered at an ENTER operation 402 and processing transitions to a DETECT SHUTDOWN operation 404.

In DETECT SHUTDOWN operation 404, secure system shutdown application 148 detects a shutdown event on user device 102. For example, secure system shutdown application 148 detects a user input entered on user device 102, such as key input or graphical user interface (GUI) selection input, to shutdown user device 102. In one embodiment, detection of the shutdown event results in secure system shutdown application 148 interrupting the shutdown process of user device 102 to allow the operations of method 400 to be performed. From DETECT SHUTDOWN 404, processing transitions to a SECURE SHUTDOWN check operation 406.

In SECURE SHUTDOWN check operation 406, secure system shutdown application 148 determines whether a secure shutdown has been selected. In one embodiment, the user input indicates whether or not a secure system shutdown is selected. In another embodiment, where a secure system shutdown is not indicated, secure system shutdown application 148 generates and sends a query to the user whether or not a secure system shutdown is to be initiated. The user response to the query is received by secure system shutdown application 148, and a determination is made whether secure shutdown has been selected.

In one embodiment, when a secure shutdown is selected ("YES"), from SECURE SHUTDOWN check operation 406, processing transitions to a DELETE USER KEY LIST ENTRY operation 408, further described later herein. Alternatively, when a secure shutdown is not selected ("NO"), in one embodiment, from SECURE SHUTDOWN check operation 406, processing transitions to a PERFORM POLICY CHECK operation 412.

In PERFORM POLICY CHECK operation 412, secure shutdown application 148 accesses or queries a system shutdown policy, such as a stored security policy associated with user device 102, and obtains shutdown policy information that indicates whether or not a secure system shutdown is to be performed on shutdown of user device 102. From PERFORM POLICY CHECK operation 412, processing transitions to an IMPOSE SECURE SHUTDOWN check operation 414.

In IMPOSE SECURE SHUTDOWN check operation 414, a determination is made whether or not to impose a secure shutdown of user device 102. In one embodiment, secure shutdown application 148 makes the determination based on the shutdown policy information obtained in operation 412.

In one embodiment, when the shutdown policy information indicates a secure shutdown is not required to be performed ("NO"), from IMPOSE SECURE SHUTDOWN check operation 414, processing transitions to a SHUTDOWN USER DEVICE operation 410, further described later herein. Alternatively, when the shutdown policy information indicates a secure shutdown is required to be performed ("YES"), from IMPOSE SECURE SHUTDOWN check operation 414, processing transitions to DELETE USER KEY LIST ENTRY operation 408.

In DELETE USER KEY LIST ENTRY operation 408, the user key list entry associated with the user's private key, K-pri-N, is deleted from key list 116. In one embodiment, the user's private key is securely deleted from key list 116. Secure deletion of data from storage areas, such as from disks, is well known to those of skill in art and not further described herein to avoid detraction from the description. Deletion of the user key list entry, e.g., Key list entry 202A, from key list 116 prevents the user from utilizing the current user private key to decrypt the session key and consequently prevents the user from accessing encrypted data 118.

Figure 2B:
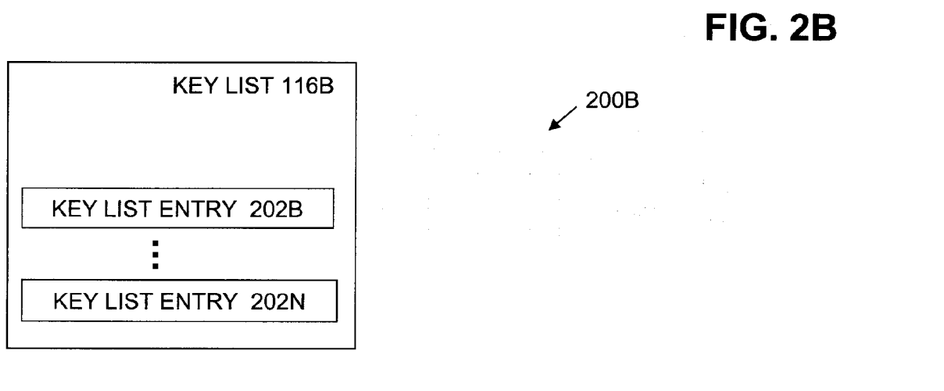
FIG. 2B is a diagram illustrating the key list of FIG. 2A following deletion of a key list entry in accordance with one embodiment.
Figure 2C:
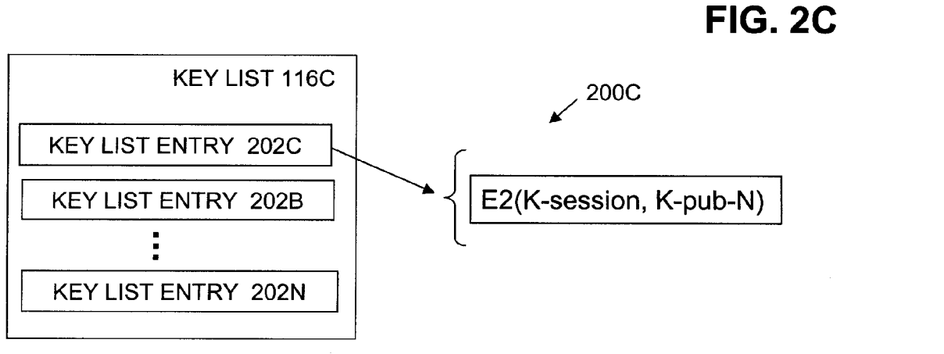
FIG. 2C is a diagram illustrating the key list of FIG. 2B with re-provisioning of a key list entry in accordance with one embodiment.

FIG. 2B is a diagram of a key list 116B following removal of user key entry 202A from key list 116A of FIG. 2A. In FIG. 2B, user key entry 202A is no longer present in key list 116B. From DELETE USER KEY LIST ENTRY operation 408, processing transitions to a SHUTDOWN USER DEVICE operation 410.

In SHUTDOWN USER DEVICE operation 410, user device 102 is shutdown. More particularly, following deletion of user key list entry 202A, secure shutdown application 148 permits user device 102 to continue shutdown operations, e.g., shutdown of user device 102 is resumed. Standard shutdown operations are well known to those of skill in the art and are not further described herein to avoid detracting from the description. From SHUTDOWN USER DEVICE operation 410, processing transitions to an EXIT operation 416, with processing exiting method 400.

Thus, in one embodiment, user device 102 is now securely shutdown, such that even if user 152 is coerced into providing the user private key, the user private key will not have a corresponding key list entry in key list 116 and consequently the user's private key cannot be used to decrypt encrypted data 118 on user device 102.

In some embodiments, secure system shutdown application 148 includes further methods to mitigate adverse effects upon the user, such as when the user is in hostile or other coercive environments and/or to allow the user to remotely restart and obtain a user private key when in a trusted environment.

Figure 5:
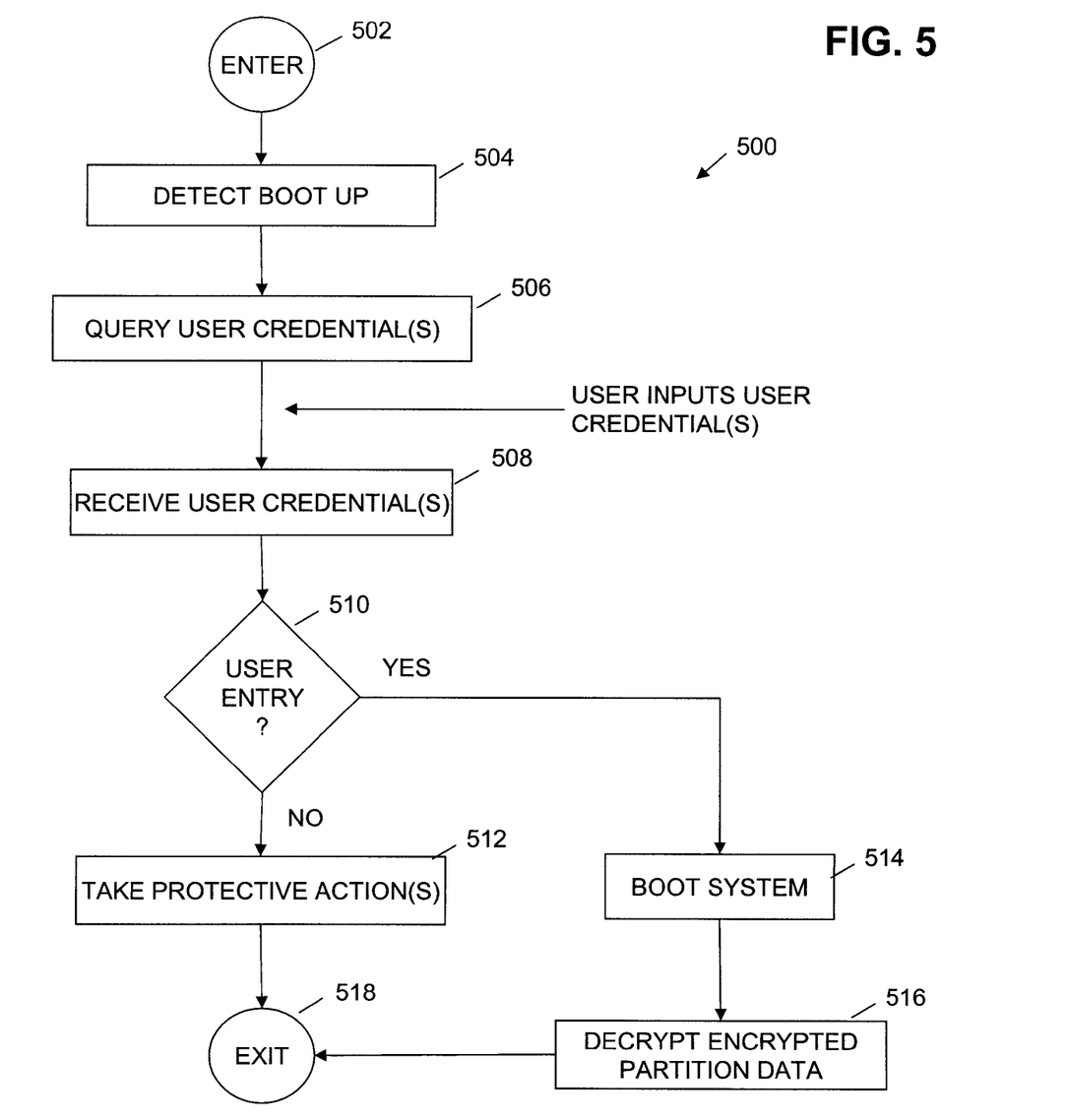
FIG. 5 is a process flow diagram of a method for restarting a user device following a secure system shutdown in accordance with one embodiment.

FIG. 5 illustrates a process for restart of user device 102 following secure shutdown in accordance with one embodiment. More particularly, in this embodiment, it is assumed that user device 102 was securely shutdown, i.e., shutdown in accordance with method 400, and user 152 is in an assumed hostile or coercive environment, e.g., is restarting user device 102 under duress.

Referring now to FIGS. 1, 2A/2B and 5 together, in one embodiment, execution of secure system shutdown application 148 by processor 108 results in the operations of method 500 as described below. In one embodiment, method 500 is entered at an ENTER operation 502 and processing transitions to a DETECT RESTART operation 504.

In DETECT BOOT UP operation 504, secure system shutdown application 148 detects boot up, e.g., restart, of user device 102. For example, secure system shutdown application 148 detects a power up event or a boot execute event on user device 102. In one embodiment, detection of the boot up results in secure system shutdown application 148 interrupting the boot process of user device 102 to allow the operations of method 500 to be performed. From DETECT BOOT UP operation 504, processing transitions to a QUERY USER CREDENTIAL(S) operation 506.

In QUERY USER CREDENTIAL(S) operation 506, secure system shutdown application 148 generates and sends a user credential query that is displayed on user device 102, such as on display device 122. In one embodiment, the query is displayed to user 152 as a GUI which allows user 152 to enter one or more user credentials, such as a name and password and/or user private key, K-pri-N, for restart of user device 102. From QUERY USER CREDENTIAL(S) operation 506, processing waits and transitions to a RECEIVE USER CREDENTIAL(S) operation 508 on receipt of input user credential(s).

In RECEIVE USER CREDENTIAL(S) operation 508, secure system shutdown application 148 receives the user credential(s) input by user 152 in response to the query of operation 506. From RECEIVE USER CREDENTIAL(S) operation 508, processing transitions to a USER ENTRY check operation 510.

In USER ENTRY check operation 510, secure system shutdown application 148 determines whether or not the user credential(s) received in operation 506, correspond to a key list entry in key list 116. In one embodiment, if the user credential(s) correspond to a key list entry in key list 116 ("YES"), from USER ENTRY check operation 510, processing transitions to a BOOT SYSTEM operation 514.

In BOOT SYSTEM operation 514, user device 102 is permitted to proceed with boot operations and restart user device 102. Standard boot operations of a user device are well known to those of skill in art and not further described herein to avoid detracting from the description. From BOOT SYSTEM operation 514, processing transitions to a DECRYPT ENCRYPTED PARTITION DATA operation 516.

In DECRYPT ENCRYPTED PARTITION DATA operation 516, the user credential(s) received in operation 508 are used to complete the public key in the corresponding key list entry in key list 116 and decrypt the session key, which in turn is used to decrypt the encrypted partition and access encrypted data 118. From DECRYPT ENCRYPTED PARTITION DATA operation 516, processing transitions to an EXIT operation 518 with processing exiting method 500.

Referring now back again to USER ENTRY check operation 510, alternatively, in one embodiment, if the user credentials do not correspond to a key list entry in key list 116 ("NO"), from USER ENTRY check operation 510 processing transitions to a TAKE PROTECTIVE ACTION(S) operation 512.

In TAKE PROTECTIVE ACTION(S) 512, one or more protective actions are taken. For example, when the input user credential(s) do not correspond to at least one key list entry in key list 116 it is assumed that protective action is needed, e.g., the restart is under duress. In one embodiment, the user is queried again for user credential(s). In some embodiments, a security alert is generated and sent, such as to key management system device 130, and/or to an alert system. In some embodiments, the user is automatically redirected to dummy information or a non-encrypted area of data. In still other embodiments, the user is sent a default error message, the system is shutdown, or encrypted data 118 is securely deleted. In various embodiments, the protective actions can be modified to address specific environments user 152 may encounter, such as while traveling with user device 102. From TAKE PROTECTIVE ACTION(S) operation 512 processing transitions to EXIT operation 512, with processing exiting method 500.

Figure 6A:
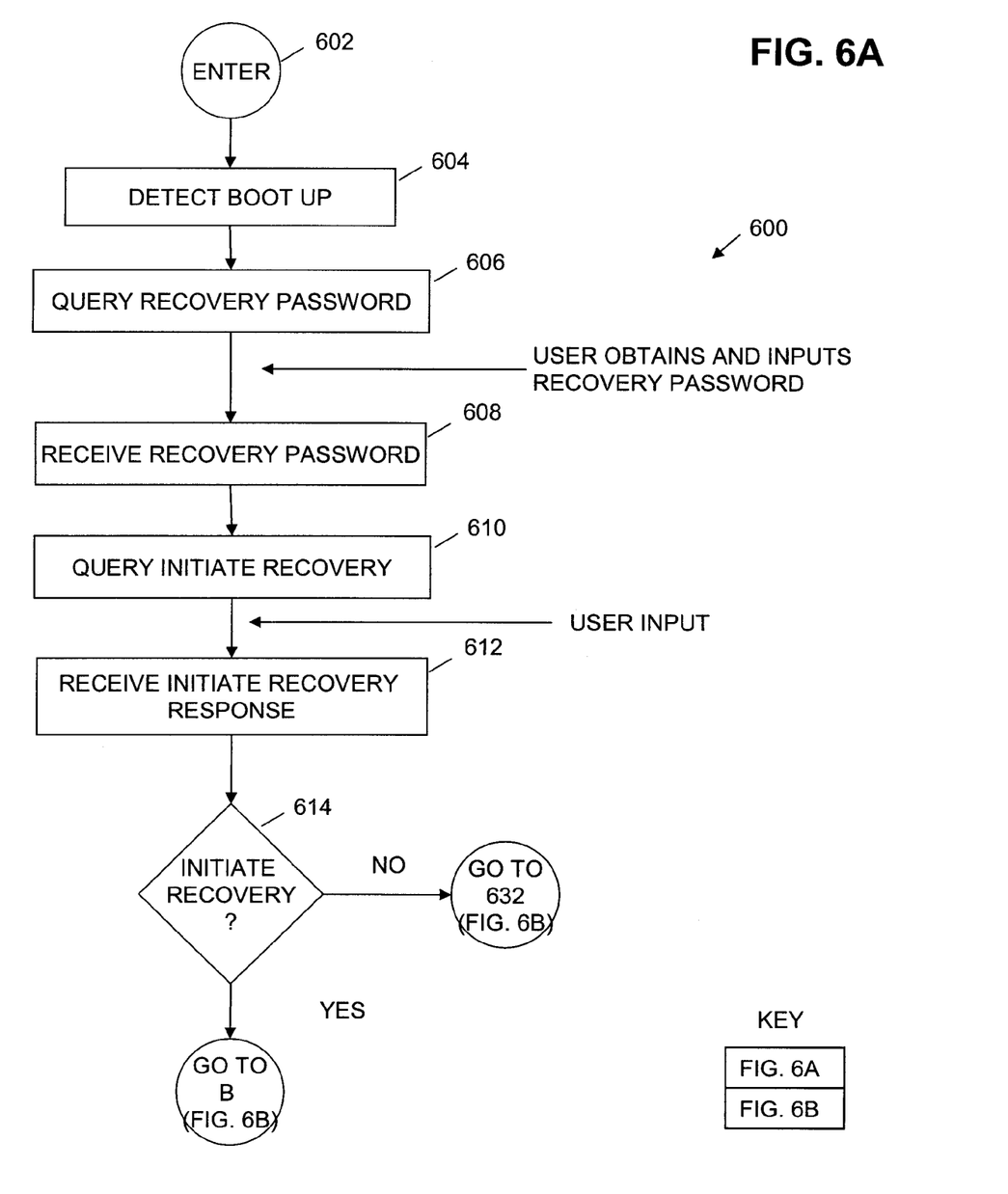
FIGS. 6A and 6B are a process flow diagram of a method for restarting a user device following a secure system shutdown in accordance with one embodiment.
Figure 6B:
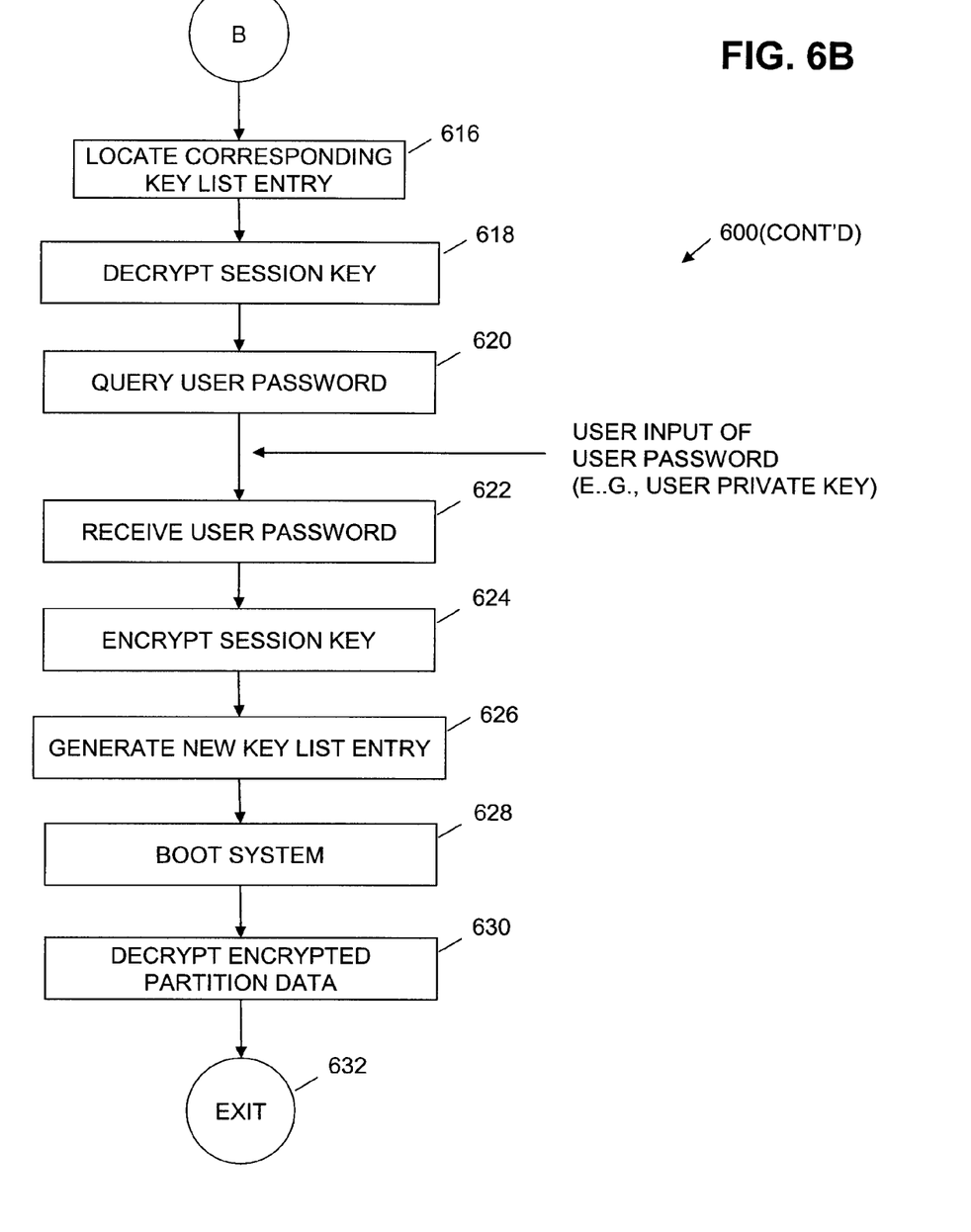

In some embodiments, secure system shutdown application 148 includes further operations to allow remote start up of user device 102 when user 152 is in a trusted environment. FIGS. 6A and 6B illustrate a process flow diagram of a method 600 for remote restart of user device 102 in a trusted environment in accordance with another embodiment. More particularly, user 152 separately obtains a recovery password over a trusted communication channel, such as from user 154 via trusted communication channel 156, to input to remote restart method 600.

Referring now to FIGS. 1, 2A/2B/2C, and 6A/6B together, in one embodiment, execution of secure system shutdown application 148 by processor 108 results in the operations of method 600 as described below. In one embodiment, as shown in FIG. 6A, method 600 is entered at an ENTER operation 602 and from ENTER operation 602 processing transitions to a DETECT RESTART operation 604.

In DETECT BOOT UP operation 604, secure system shutdown application 148 detects a boot up, e.g., a restart of user device 102. For example, secure system shutdown application 148 detects a power up event or a boot execute event on user device 102. In one embodiment, detection of the boot up results in secure system shutdown application 148 interrupting the boot process of user device 102 to allow the operations of method 600 to be performed. From DETECT BOOT UP operation 604, processing transitions to a QUERY RECOVERY PASSWORD operation 606.

In QUERY RECOVERY PASSWORD operation 606, secure system shutdown application 148 generates and sends a recovery password query that is displayed on user device 102, such as on display device 122 to user 152. In one embodiment, the query is displayed to user 152 as a GUI which allows user 152 to enter at least one recovery password for restart of user device 102. In the present embodiment, user 152 separately obtains a recovery password over a trusted communication channel, such as from user 154 via trusted communication channel 156, to input to remote restart method 600. From QUERY RECOVERY PASSWORD operation 606, processing waits and transitions to a RECEIVE RECOVERY PASSWORD operation 608 on receipt of at least one recovery password.

In RECEIVE RECOVERY PASSWORD operation 608, secure system shutdown application 148 receives the recovery password input by user 152 in response to the query of operation 606. From RECEIVE RECOVERY PASSWORD operation 608, processing transitions to a QUERY INITIATE RECOVERY operation 610.

In QUERY INITIATE RECOVERY operation 610, secure system shutdown application 148 generates and sends an initiate recovery query that is displayed on user device 102, such as on display device 122 to user 152. In one embodiment, the query is displayed to user 152 as a GUI which allows the user to enter at least one recovery password for restart of user device 102. From QUERY INITIATE RECOVERY operation 610, processing waits and transitions to a RECEIVE INITIATE RECOVERY RESPONSE operation 612 on receipt of a response to the initiate recovery query.

In RECEIVE INITIATE RECOVERY RESPONSE operation 612, secure system shutdown application 148 receives the response input by user 152 in response to the initiate recovery query of operation 610, for example, an input of a "YES" or a "NO". From RECEIVE INITIATE RECOVERY RESPONSE operation 612, processing transitions to an INITIATE RECOVERY check operation 614.

In INITIATE RECOVERY check operation 614, a determination is made whether or not to initiate recovery of the key list entry based on the initiate recovery response received in operation 612. In one embodiment, if user 152 inputs a selection not to initiate recovery ("NO"), from INITIATE RECOVERY check operation 614, processing transitions to an EXIT operation 632 (FIG. 6B), with processing exiting method 600. Alternatively, if user 152 inputs a selection to initiate recovery ("YES"), from INITIATE RECOVERY check operation 614, processing transitions to a LOCATE CORRESPONDING KEY LIST ENTRY operation 616 (FIG. 6B).

Referring now to FIG. 6B, in LOCATE CORRESPONDING KEY LIST ENTRY operation 616, secure system shutdown application 148 locates the corresponding key list entry in key list 116, e.g., the key list entry in key list 116 which corresponds to the recovery password provided to the user and input to user device 102. For example, referring again to FIG. 2B, the key list entry corresponding to the recovery password can be key list entry 202B. From LOCATE CORRESPONDING KEY LIST ENTRY operation 616, processing transitions to a DECRYPT SESSION KEY operation 618.

In DECRYPT SESSION KEY operation 618, the recovery password is utilized to decrypt the session key in the corresponding key list entry. For example, the recovery password completes the public-private key pair of key list entry 202B and decrypts the session key K-session of key list entry 202B. From DECRYPT SESSION KEY operation 618, processing transitions to a QUERY USER PASSWORD operation 620.

In QUERY USER PASSWORD operation 620, the user is queried for a user password. In one embodiment, secure system shutdown application 148 generates and sends a user password query that is displayed on user device 102, such as on display device 122 to user 152. In one embodiment, the query is displayed to user 152 as a GUI which allows the user to enter at least one user password. In one embodiment, the user password is the initial user private key that originally corresponded to the deleted key list entry, e.g., the user private key to key list entry 202A. From QUERY USER PASSWORD operation 620, processing transitions to a RECEIVE USER PASSWORD operation 622 on receipt of at least one user password.

In RECEIVE USER PASSWORD operation 622, secure system shutdown application 148 receives the user password input by user 152 in response to the query of operation 620. From RECEIVE USER PASSWORD operation 622, processing transitions to an ENCRYPT SESSION KEY operation 624.

In ENCRYPT SESSION KEY operation 624, the session key decrypted in operation 618 is encrypted utilizing the user password received in operation 622, e.g., the user's private key that corresponded to deleted key list entry 202A. From ENCRYPT SESSION KEY operation 624, processing transitions to a GENERATE NEW KEY LIST ENTRY operation 626.

In GENERATE NEW KEY LIST ENTRY operation 626, a new key list entry is generated in key list 116. More particularly, in one embodiment, the session key encrypted in operation 624 is now stored in as a new key list entry in key list 116. In this way the user's password, e.g., the user's private key, can again be utilized to decrypt encrypted data 118. For example, in FIG. 2C, new key list entry 202C is added to key list 116C. In the present embodiment key list entry 202C includes the session key encrypted with the user's private key half of the public-private key pair. From GENERATE NEW KEY LIST ENTRY operation 626, processing transitions to a BOOT SYSTEM operation 628.

In BOOT SYSTEM operation 628, user device 102 is permitted to continue boot loading and restart. From BOOT SYSTEM operation 628, processing transitions to a DECRYPT ENCRYPTED PARTITION DATA operation 630.

In DECRYPT ENCRYPTED PARTITION DATA operation 630, the user credential(s) received in operation 622 are used to complete the public key in the new key list entry in key list 116, e.g., key list entry 202C, which in turn is used to decrypt the encrypted partition and encrypted data 118. From DECRYPT ENCRYPTED PARTITION DATA operation 630, processing transitions to EXIT operation 632 with processing exiting method 600.

In DECRYPT ENCRYPTED PARTITION DATA operation 516, the user credential(s) received in operation 508 are used to complete the public key in the corresponding key list entry in key list 116 and decrypt the session key, which in turn is used to decrypt the encrypted partition and access encrypted data 118. From DECRYPT ENCRYPTED PARTITION DATA operation 516, In one embodiment, user device 102 further includes automated, secure key re-provisioning application 150 which implements an automated, secure key re-provisioning process. More particularly, the user does not have to establish a separate trusted communication channel with a user of key management system device 130, but rather can automatically, and securely re-provision a private key over a network, such as network 146.

FIGS. 7A and 7B are a process flow diagram of a method 700 for automated secure key re-provisioning in accordance with one embodiment. Referring now to FIGS. 1, 2A/2B/2C, 3, and 7A/7B together, in one embodiment, execution of automated secure key re-provisioning application 150 by processor 108 results in the operations of method 700 as described below. In one embodiment, as shown in FIG. 7A, method 700 is entered at an ENTER operation 702 and processing transitions to a DETECT BOOT UP operation 704.

In DETECT BOOT UP operation 704, automated secure key re-provisioning application 150 detects boot up, e.g., a boot event, on user device 102. For example, automated secure key re-provisioning application 150 detects a boot execute event on user device 102. In one embodiment, detection of the boot event results in automated secure key re-provisioning application 150 interrupting the boot process of user device 102 to allow the operations of method 700 to be performed. From DETECT BOOT UP operation 704, processing transitions to a QUERY USER CREDENTIAL(S) operation 706.

In QUERY USER CREDENTIAL(S) operation 706, automated secure key re-provisioning application 150 generates and sends a user credential query that is displayed on user device 102, such as on display device 122. In one embodiment, the query is displayed as a GUI which allows a user, e.g., user 152, to enter one or more user credentials, such as a name and/or password, for restart of user device 102. For example, in one embodiment, the query requests a username, a user password, and/or other user authentication token(s). From QUERY USER CREDENTIAL(S) operation 706, processing transitions to a RECEIVE USER CREDENTIAL(S) operation 708 on receipt of input user credential(s).

In RECEIVE USER CREDENTIAL(S) operation 708, automated secure key re-provisioning application 150 receives the user credential(s) input by user 152 in response to the query of operation 706. For example, automated secure key re-provisioning application 150 receives a user name and a user password, or other user authentication token. From RECEIVE USER CREDENTIAL(S) operation 708, processing transitions to an OBFUSCATE USER CREDENTIAL(S) operation 710.

In OBFUSCATE USER CREDENTIAL(S) operation 710, the user credential(s) received in operation 708 are obfuscated. For example, in one embodiment automated secure key re-provisioning application 150 encrypts, hashes, or otherwise obfuscates the user credential(s). From OBFUSCATE USER CREDENTIAL(S) operation 710, processing transitions to a GENERATE RE-PROVISIONING REQUEST operation 712.

In GENERATE RE-PROVISIONING REQUEST operation 712, a re-provisioning request is automatically generated and sent to key management system device 130. In one embodiment, automated secure key re-provisioning application 150 generates and sends a re-provisioning request requesting regeneration of a user private key for the user on user device 102. More particularly, in one embodiment, the re-provisioning request includes an identifier for the device for which the user private key is being re-provisioned, e.g., an identifier for user device 102, and the obfuscated user credential(s). In this way the user's private key information is automatically and securely sent from user device 102 to key management system device 130.

In one embodiment, key management system device 130 receives the re-provisioning request and verifies the user's credential(s), for example, via the encryption, hash, or other obfuscation method. In some embodiments, key management system device 130 also validates the user device identified in the request, e.g., user device 102, is a member of the network managed by key management system device 130. Key management system device 130 automatically generates and sends a response containing some K-pri-M from a master key list entry 302A-302N and the user's original public key, K-pub-N. Thus, for example, referring to FIG. 3, key management system device 130 returns a response including for example, master key list entry 302A. In some embodiments, the master key list entry is obfuscated in the re-provisioning response. An example, of a method for generating a response to a secure key re-provisioning request by key management system device 130 is further described herein with reference to FIG. 8.

Figure 8:
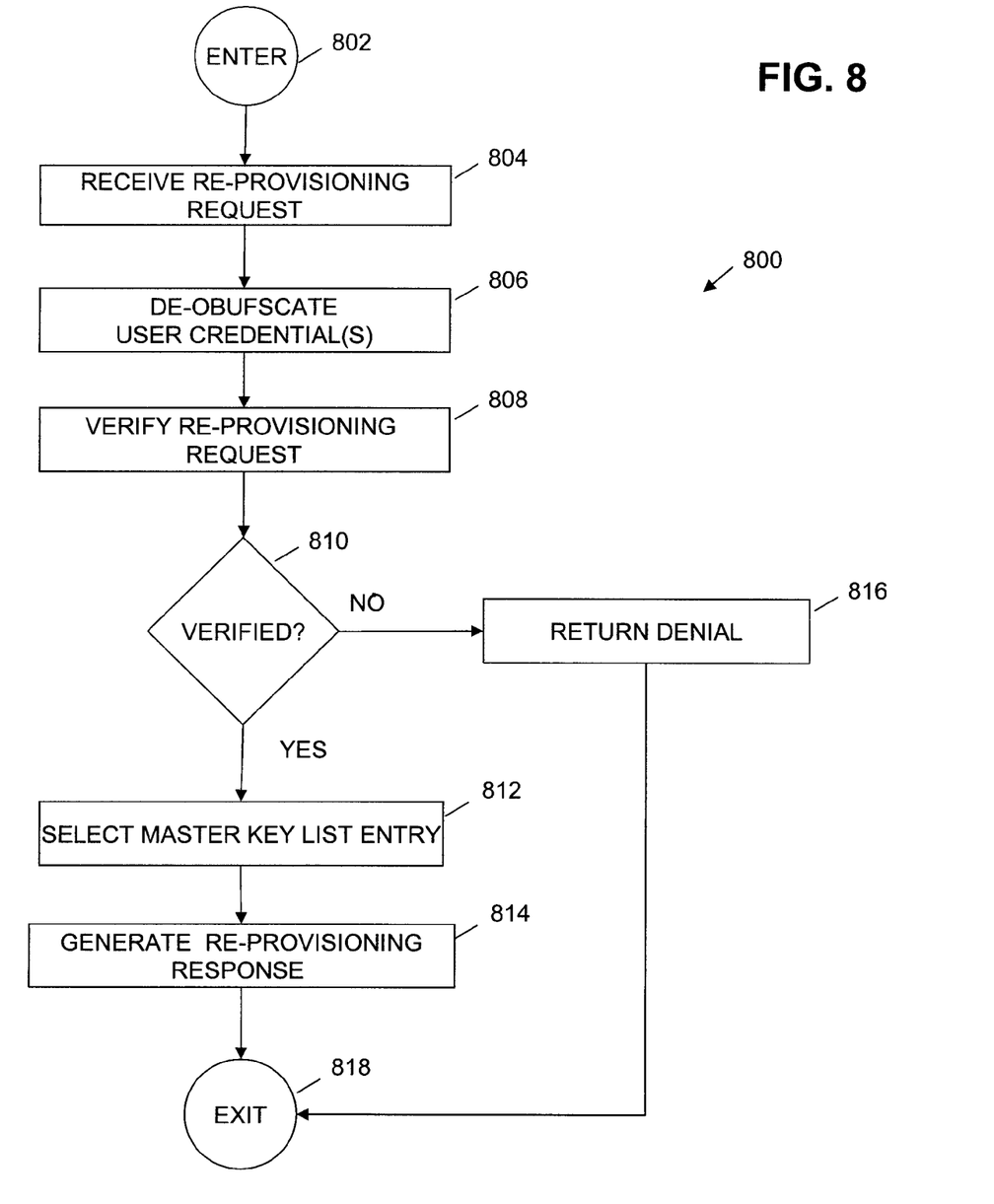
FIG. 8 is a process flow diagram of a method for generating a response to a secure key re-provisioning request in accordance with one embodiment.

FIG. 8 is a process flow diagram of a method for generating a response to a secure key re-provisioning request in accordance with one embodiment. Referring now to FIGS. 1 and 8 together, in one embodiment, execution of key management system 140 by processor 134 results in the operations of method 800 as described below in response to a key re-provisioning request from automated secure key re-provisioning application 150. In one embodiment, method 800 is entered at an ENTER operation 802 and processing transitions from ENTER operation 802 to a RECEIVE RE-PROVISIONING REQUEST operation 804.

In RECEIVE RE-PROVISIONING REQUEST operation 804, the re-provisioning request generated and sent in operation 712 (FIG. 7A) is received by key management system 140 of key management system device 130. From RECEIVE RE-PROVISIONING REQUEST operation 804, processing transitions to a DE-OBFUSCATE USER CREDENTIAL(S) operation 806.

In DE-OBFUSCATE USER CREDENTIAL(S) operation 806, the obfuscated user credential(s) received in the re-provisioning request are de-obfuscated, such as in accordance with the encryption, hash, or other obfuscation method used to obfuscate the user credential(s). Thus, key management system 140 has the user's private key. From DE-OBFUSCATE USER CREDENTIAL(S) operation 806, processing transitions to a VERIFY RE-PROVISIONING REQUEST operation 808.

In VERIFY RE-PROVISIONING REQUEST operation 808, the user's credentials and/or the user device identifier received in the re-provisioning request are evaluated to determine whether or not the re-provisioning request is verified, i.e., is valid for key re-provisioning. Any of a number of verification procedures can be used. Verification techniques are well known to those of skill in the art and are not further described herein to avoid detracting from the description. From VERIFY RE-PROVISIONING REQUEST operation 808, processing transitions to a VERIFIED check operation 810.

In VERIFIED check operation 810 a determination is made whether or not the re-provisioning request is verified based on the verification procedures performed in operation 808. In one embodiment, if the re-provisioning request is not verified ("NO"), from VERIFIED check operation 810, processing transitions to a RETURN DENIAL operation 816.

In RETURN DENIAL operation 816, a denial of the re-provisioning request is generated and returned to automated secure key re-provisioning application 150. In some embodiments, further information is provided in the denial such as an IT contact point. From RETURN DENIAL operation 816, processing transitions to an EXIT operation 818 with processing exiting method 800.

Referring again to VERIFIED check operation 810, alternatively, in one embodiment, if the re-provisioning request is verified ("YES"), from VERIFIED check operation 810, processing transitions to a SELECT MASTER KEY LIST ENTRY operation 812.

In SELECT MASTER KEY LIST ENTRY operation 812, a master key list entry 302A-302N corresponding to the user's private key is selected, for example, master key list entry 302A. From SELECT MASTER KEY LIST ENTRY operation 812, processing transitions to a GENERATE RE-PROVISIONING RESPONSE operation 814.

In GENERATE RE-PROVISIONING RESPONSE operation 814, a re-provisioning response is generated and sent to automated secure key re-provisioning application 150. In one embodiment, the re-provisioning response includes the private key and public key of the master key list entry selected in operation 812, e.g., master key list entry 302A. In some embodiments, the re-provisioning response is obfuscated to protect the key data, or sent with authentication tokens. In one embodiment, the re-provisioning response is sent to automated secure key re-provisioning application 150, for example, via network 146. From GENERATE RE-PROVISIONING RESPONSE operation 814, processing transitions to EXIT operation 818, with processing exiting method 800, or optionally returning to operation 804 on receipt of a next re-provisioning request. Referring now back to FIG. 7B, from GENERATE RE-PROVISIONING REQUEST operation 712, processing transitions to a RECEIVE RE-PROVISIONING RESPONSE operation 714 on receipt of a response to the re-provisioning request.

In RECEIVE RE-PROVISIONING RESPONSE operation 714, the response to the re-provisioning request to operation 712 is received. More particularly, automated secure key re-provisioning application 150 receives the re-provisioning response from key management system device 130. In one embodiment, as earlier described, the re-provisioning response includes the user's original public key, K-pub-N and a K-pri-M from master key list 142 needed to regenerate a user key list entry in key list 116. In some embodiments, the re-provisioning response is obfuscated and de-obfuscated on receipt by user device 102. From RECEIVE RE-PROVISIONING RESPONSE operation 714, processing transitions to a LOCATE CORRESPONDING KEY LIST ENTRY operation 716 (FIG. 7B).

Referring now to FIG. 7B, in LOCATE CORRESPONDING KEY LIST ENTRY operation 716 (FIG. 7B), secure system shutdown application 148 locates the corresponding key list entry in key list 116, e.g., the key list entry in key list 116 which corresponds to the re-provisioning private key, K-pri-M, received in operation 714. For example, referring again to FIG. 2B, the key list entry corresponding to the re-provisioning password can be key list entry 202B. From LOCATE CORRESPONDING KEY LIST ENTRY operation 716, processing transitions to a DECRYPT SESSION KEY operation 718.

In DECRYPT SESSION KEY operation 718, the re-provisioning private key is utilized to decrypt the session key in the corresponding key list entry. For example, encryption bootloader 106 uses the private key, K-pri-M, to decrypt the session key, e.g., in key list entry 202B; formally D1(entryM, K-pri-M)=K-session. As bootloader 106 knows K-pub-N, it recreates the user's entryN: E1. In some embodiments, the entry M can be deleted to prevent reuse of the token. From DECRYPT SESSION KEY operation 718, processing transitions to a QUERY USER PASSWORD operation 720.

In QUERY USER PASSWORD operation 720, the user is queried for a user password. In one embodiment, secure system shutdown application 148 generates and sends a user password query that is displayed on user device 102, such as on display device 122 to user 152. In one embodiment, the query is displayed to user 152 as a GUI which allows the user to enter at least one user password. In one embodiment, the user password is the initial user private key that originally corresponded to the deleted key list entry, e.g., the user private key to key list entry 202A. From QUERY USER PASSWORD operation 720, processing transitions to a RECEIVE USER PASSWORD operation 722 on receipt of at least one user password.

In RECEIVE USER PASSWORD operation 722, secure system shutdown application 148 receives the user password input by user 152 in response to the query of operation 720. From RECEIVE USER PASSWORD operation 722, processing transitions to an ENCRYPT SESSION KEY operation 724.

In ENCRYPT SESSION KEY operation 724, the session key decrypted in operation 718 is encrypted utilizing the user password received in operation 722, e.g., the user's private key that corresponded to deleted key list entry 202A. From ENCRYPT SESSION KEY operation 724, processing transitions to a GENERATE NEW KEY LIST ENTRY operation 726.

In GENERATE NEW KEY LIST ENTRY operation 726, a new key list entry is generated in key list 116. More particularly, in one embodiment, the session key encrypted in operation 724 is now stored in as a new key list entry in key list 116. In this way the user's password, e.g., the user's private key, can again be utilized to decrypt encrypted data 118. For example, in FIG. 2C, new key list entry 202C is added to key list 116C. In the present embodiment key list entry 202C includes the session key encrypted with the user's private key half of the public-private key pair. Referring back to FIG. 7B, from GENERATE NEW KEY LIST ENTRY operation 726, processing transitions to a BOOT SYSTEM operation 728.

In BOOT SYSTEM operation 728, user device 102 is permitted to continue boot loading and start up of user device 102. From BOOT SYSTEM operation 728, processing transitions to a DECRYPT ENCRYPTED PARTITION DATA operation 730.

In DECRYPT ENCRYPTED PARTITION DATA operation 730, the user credential(s) received in operation 722 are used to decrypt the session key in the new key list entry, e.g. key list entry 202C, which in turn is used to decrypt the encrypted partition and encrypted data 118. From DECRYPT ENCRYPTED PARTITION DATA operation 730, processing transitions to EXIT operation 732 with processing exiting method 700.

In one embodiment, secure system shutdown method 148 and automated secure key re-provisioning application 150 are in memory 112. As used herein, a computer memory refers to a volatile memory, a non-volatile memory, or a combination of the two. Although secure system shutdown method 148 and automated secure key re-provisioning application 150 are referred to as applications, this is illustrative only. Secure system shutdown method 148 and automated secure key re-provisioning application 150 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

Various embodiments may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment. Some examples of computer program products are CD-ROM disks, DVDs, ROM cards, floppy disks, magnetic tapes, computer hard drives, and servers on a network. In another embodiment, a computer program product comprises a tangible storage medium configured to store computer readable code including CD-ROM disks, DVDs, ROM cards, floppy disks, magnetic tapes, computer hard drives, and servers on a network.

As illustrated in FIG. 1, this medium may belong to the computer system itself. However, the medium also may be removed from the computer system. For example, secure system shutdown method 148 and automated secure key re-provisioning application 150 are may be stored in memory (not shown) that is physically located in a location different from processor 108. Processor 108 should be coupled to the memory. This could be accomplished in a client-server system, or alternatively via a connection to another computer via modems and analog lines, or digital interfaces and a digital carrier line.

More specifically, in one embodiment, user device 102 and/or server computer system 130 is a portable computer, a workstation, a two-way pager, a cellular telephone, a digital wireless telephone, a personal digital assistant, a server computer, an Internet appliance, or any other device that includes components that can execute the functionality of secure system shutdown method 148 and/or automated secure key re-provisioning application 150 in accordance with at least one of the embodiments as described herein. Similarly, in another embodiment, user device 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of secure system shutdown method 148 and automated secure key re-provisioning application 150 in accordance with one embodiment can be implemented in a wide variety of computer system configurations. In addition, the functionality of secure system shutdown method 148 and automated secure key re-provisioning application 150 could be stored as different modules in memories of different devices.

For example, secure system shutdown method 148 could initially be stored on a server computer system, and then as necessary, a portion of secure system shutdown method 148 could be transferred to user device 102 and executed on user device 102. Consequently, part of the functionality of secure system shutdown method 148 would be executed on a processor of the server computer system and another part would be executed on processor 108 of user device 102. In view of this disclosure, those of skill in the art can implement various embodiments in a wide-variety of physical hardware configurations using an operating system and computer programming language of interest to the user.

This disclosure provides exemplary embodiments. The scope of the invention is not limited by these exemplary embodiments. Numerous variations, whether explicitly provided for by the specification or implied by the specification or not, may be implemented by one of skill in the art in view of this disclosure.

What is claimed is:

1. A computer implemented method for secure shutdown of a user device comprising:
    detecting a shutdown of said user device, said user device including a key list having a first key list entry corresponding to a user private key for use in decrypting an encrypted partition storing encrypted data on said user device;
    determining, by a hardware processor, whether or not to securely shutdown said user device;
    wherein upon a determination to securely shutdown said user device, deleting said first key list entry from said key list; and
    permitting said shutdown of said user device to proceed;
    detecting a boot up of the user device, said user device including the key list;
    querying a user for input of at least one user credential to said user device;
    receiving said input of said at least one user credential;
    obfuscating said at least one user credential, said obfuscating generating at least one obfuscated user credential;
    generating a key re-provisioning request, said key re-provisioning request requesting a key re-provisioning from a key management system device and including said at least one obfuscated user credential;
    sending said key re-provisioning request to said key management system device;
    receiving a key re-provisioning response from said key management system device, said key re-provisioning response including at least a key re-provisioning password;
    locating a key list entry in said key list corresponding to said key re-provisioning password, said key list entry including an encrypted session key;
    decrypting said encrypted session key utilizing at least said key re-provisioning password;
    querying said user for input of at least one user password;
    receiving said input of said at least one user password on said user device;
    encrypting said decrypted session key utilizing said at least one user password;
    generating a new key list entry corresponding to said user private key in said key list; and
    permitting said boot up of said user device to proceed.

2. The computer implemented method of claim 1 further comprising:
    wherein upon a determination not to securely shutdown said user device, permitting said shutdown of said user device to proceed.

3. The computer implemented method of claim 1 wherein upon a determination not to securely shutdown said user device, performing a policy check, said policy check obtaining information on whether or not to impose a secure shutdown of said user device;
    determining whether or not to impose said secure shutdown of said user device based on said policy check;
    wherein upon a determination to impose said secure shutdown of said user device based on said policy check, deleting said first key entry from said key list; and
    permitting said shutdown of said user device to proceed.

4. The computer implemented method of claim 1 wherein said first key entry is securely deleted.

5. The computer implemented method of claim 3 wherein upon a determination not to impose said secure shutdown of said user device based on said policy check, permitting said shutdown of said user device to proceed.

6. The computer implemented method of claim 1 further comprising:
    detecting said boot up of said user device;
    querying said user for input of at least one user credential to said user device;
    receiving said input of at least one user credential;
    determining whether or not said at least one user credential corresponds to a key list entry in said key list; and
    wherein upon a determination that said at least one user credential does not correspond to said at least one key list entry, taking protective action(s).

7. The computer implemented method of claim 6 wherein upon a determination that said at least one user credential corresponds to said at least one key list entry, permitting said boot up of said user device to proceed; and
    decrypting said encrypted partition.

8. The computer implemented method of claim 6 wherein said protective action(s) include directing said user device to an area of dummy data.

9. The computer implemented method of claim 1 further comprising:

upon detecting boot up of said user device, querying said user of said user device for input of at least one recovery password to said user device;

receiving said input of said at least one recovery password;

querying said user for input of whether or not to initiate recovery of a key list entry corresponding to said user private key;

receiving said input of whether or not to initiate recovery of said key list entry;

determining whether or not to initiate recovery of said key list entry based on said input of whether or not to initiate recovery of a key list entry corresponding to said user private key;

wherein upon a determination to initiate recovery of said key list entry corresponding to said user private key, locating a second key list entry corresponding to said recovery password in said key list;

decrypting a session key present in said second key list entry utilizing at least said recovery password;

querying said user for input of at least one user password;

receiving said input of said at least one user password on said user device;

encrypting said decrypted session key utilizing said at least one user password;

generating a new key list entry corresponding to said user private key in said key list; and permitting said boot up of said user device to proceed.

10. The computer implemented method of claim 9 further comprising:

decrypting said encrypted partition.

11. The computer implemented method of claim 9 wherein said user obtains said recovery password from a user of a key management system device over a trusted communication channel.

12. The computer implemented method of claim 1 further comprising:

decrypting said encrypted partition.

13. The computer implemented method of claim 1 wherein said key re-provisioning request further comprises:

at least an identifier of said user device.

14. A computer program product comprising a non-transitory computer readable storage medium storing computer program code comprising:

detecting a shutdown of a user device, said user device including a key list having a first key list entry corresponding to a user private key for use in decrypting an encrypted partition storing encrypted data on said user device;

determining whether or not to securely shutdown said user device;

wherein upon a determination to securely shutdown said user device, deleting said first key list entry from said key list; and permitting said shutdown of said user device to proceed;

detecting a boot up of the user device, said user device including the key list;

querying a user for input of at least one user credential to said user device;

receiving said input of said at least one user credential;

obfuscating said at least one user credential, said obfuscating generating at least one obfuscated user credential;

generating a key re-provisioning request, said key re-provisioning request requesting a key re-provisioning from a key management system device and including said at least one obfuscated user credential;

sending said key re-provisioning request to said key management system device;

receiving a key re-provisioning response from said key management system device, said key re-provisioning response including at least a key re-provisioning password;

locating a key list entry in said key list corresponding to said key re-provisioning password, said key list entry including an encrypted session key;

decrypting said encrypted session key utilizing at least said key re-provisioning password;

querying said user for input of at least one user password;

receiving said input of said at least one user password on said user device;

encrypting said decrypted session key utilizing said at least one user password;

generating a new key list entry corresponding to said user private key in said key list; and permitting said boot up of said user device to proceed.

15. The computer program product of claim 14, further comprising:

detecting said boot up of said user device;

querying said user for input of at least one user credential to said user device;

receiving said input of said at least one user credential;

determining whether or not said at least one user credential corresponds to a key list entry in said key list;

wherein upon a determination that said at least one user credential does not correspond to said at least one key list entry, said secure system shutdown application further for taking protective action(s).

16. The computer program product of claim 14, further comprising:

upon detecting boot up of said user device, querying said user of said user device for input of at least one recovery password to said user device;

receiving said input of said at least one recovery password;

querying said user for input of whether or not to initiate recovery of a key list entry corresponding to said user private key;

receiving said input of whether or not to initiate recovery of said key list entry;

determining whether or not to initiate recovery of said key list entry based on said input of whether or not to initiate recovery of a key list entry corresponding to said user private key;

wherein upon a determination to initiate recovery of said key list entry corresponding to said user private key, said secure system shutdown application further for locating a second key list entry corresponding to said recovery password in said key list;

decrypting a session key present in said second key list entry utilizing at least said recovery password;

querying said user for input of at least one user password;

receiving said input of said at least one user password on said user device;

encrypting said session key utilizing said at least one user password;

generating a new key list entry corresponding to said user private key in said key list; and permitting said boot up to proceed.

17. The computer program product of claim 16, further comprising:

decrypting said encrypted partition.

18. The computer program product of claim 17 wherein said key re-provisioning request further comprises:

at least an identifier of said user device.

* * * * *